(12) United States Patent
Adamson et al.

(10) Patent No.: US 7,657,417 B2
(45) Date of Patent: Feb. 2, 2010

(54) METHOD, SYSTEM AND MACHINE READABLE MEDIUM FOR PUBLISHING DOCUMENTS USING AN ONTOLOGICAL MODELING SYSTEM

(75) Inventors: Dan Adamson, San Francisco, CA (US); Leo Shih, East Palo Alto, CA (US); Alain T. Rappaport, San Mateo, CA (US)

(73) Assignee: Microsoft Corporation, Redmond, WA (US)

( * ) Notice: Subject to any disclaimer, the term of this patent is extended or adjusted under 35 U.S.C. 154(b) by 515 days.

(21) Appl. No.: 10/665,807

(22) Filed: Sep. 19, 2003

(65) Prior Publication Data
US 2004/0133414 A1 Jul. 8, 2004

Related U.S. Application Data

(60) Provisional application No. 60/411,902, filed on Sep. 19, 2002.

(51) Int. Cl.
*G06F 17/50* (2006.01)
*G06F 9/455* (2006.01)
*G06F 7/00* (2006.01)
*G06F 17/00* (2006.01)

(52) U.S. Cl. ............ 703/22; 703/2; 707/6; 715/500; 715/523

(58) Field of Classification Search ......... 703/22, 703/2; 715/513, 762, 500, 523, 200, 234; 704/1–2, 9; 707/3, 6; 705/500, 523
See application file for complete search history.

(56) References Cited

U.S. PATENT DOCUMENTS

| 7,131,066 | B1 * | 10/2006 | Birsan et al. ........... 715/523 |
| 7,149,734 | B2 * | 12/2006 | Carlson et al. ............ 707/6 |
| 2003/0154071 | A1 * | 8/2003 | Shreve ................. 704/9 |
| 2003/0226109 | A1 * | 12/2003 | Adamson et al. ......... 715/513 |
| 2005/0091601 | A1 * | 4/2005 | Raymond et al. ......... 715/762 |

OTHER PUBLICATIONS

"Resource Description Framework (RDF) Model and Syntax Specification", W3C Recommendation. Feb. 22, 1999. http://www.w3.org/TR/1999/REC-rdf-syntax-19990222/.*
"Editor's Draft of RDF/XML Syntax Specification (Revised)." W3C Proposed Recommendation. Dec. 15, 2003. http://www.dajobe.org/2001/07/rdf-syntax-grammar/.*
Huhns, M.N. and M.P. Singh. "Ontologies for Agents." IEEE Internet Computing. Nov./Dec. 1997. vol. 1, Issue 6, pp. 81-83.*
van der Vet, P.E. and N.J.I. Mars. "Bottom-up Construction of Ontologies." IEEE Transactions on Knowledge and Data Engineering. Jul./Aug. 1998, vol. 10, Issue 4, pp. 513-526.*

(Continued)

*Primary Examiner*—Paul L Rodriguez
*Assistant Examiner*—Nithya Janakiraman
(74) *Attorney, Agent, or Firm*—Turocy & Watson, LLP

(57) ABSTRACT

A method, system and machine readable medium are disclosed to process one or more documents in a domain. The method includes modeling the domain with a plurality of domain models using an ontological system; representing each document as a collection of one or more domain models; and populating the domain models that are used to represent the document with values corresponding to properties of the document being represented.

17 Claims, 4 Drawing Sheets

OTHER PUBLICATIONS

Hunter, J. "Enhancing the Semantic Interoperability of Multimedia Through a Core Ontology." IEEE Transactions on Circuits and Systems for Video Technology. Jan. 2003. vol. 13, Issue 1, pp. 49-58.*

Molina, M. "Building a Decision Support System With A Knowledge Management Tool." Journal of Decision Systems. 2006. http://www.dia.fi.upm.es/grupos/I&K/06-building-decision-support.pdf.*

Chandrasekaran, B. et al. "What are Ontologies, and Why Do We Need Them?" IEEE Intelligent Systems. Jan./Feb. 1999. vol. 14, Issue 1, pp. 20-26.*

Knight, K. and S. Luk. "Building a Large-Scale Knowledge Base for Machine Translation." Proc. Am. Assoc. Artificial Intelligence, AAAI Press. 1994. http://arxiv.org/PS_cache/cmp-Ig/pdf/9407/9407029v1.pdf.*

Debnath, S. et al. "LawBot: a Multiagent Assistant for Legal Research." IEEE Internet COmputing. Nov./Dec. 2000. vol. 4, Issue 6, pp. 32-37.*

Le Hégaret et al., "What is the Document Object Model?". Nov. 13, 2000. Available at http://www.w3.org/TR/DOM-Level-2-Core/introduction.html.*

"LawBot: A Multiagent Assistant for Legal Research", Sandip Debnath, Sandip Sen, Brent Blackstock. Nov.-Dec. 2000.*

"An Ontology for the Construction of Legal Decision Support Systems", Zeleznikow and Stranieri. Second International Workshop on Legal Ontologies, Dec. 13, 2001.*

* cited by examiner

METHOD, SYSTEM AND MACHINE READABLE MEDIUM FOR PUBLISHING DOCUMENTS USING AN ONTOLOGICAL MODELING SYSTEM

RELATED APPLICATIONS

This application claims the benefit of U.S. Provisional Application No. 60/411,902, filed Sep. 19, 2002, which is incorporated herein in its entirety by reference.

FIELD OF THE INVENTION

This invention relates generally to the field of information processing and to information modeling systems. More particularly, this invention relates to a method for publishing documents based on underlying ontological models representative of the concepts contained within the documents.

BACKGROUND OF THE INVENTION

Many approaches exist to cataloging or indexing documents and making them available as part of a collection to users. Simple search systems, for example, allow for the selection of documents based on text (keyword) searching.

Other approaches may involve the use of taxonomy-based methodologies to classify documents into certain categories. In these approaches, taxonomies of the domain are defined and documents are tagged or sorted into categories in accordance with the relevance of these documents to elements of the defined taxonomies. While this is useful for organizing or classifying a collection of documents, it does little to increase their searchability if they are not sorted using categories appropriate to the search context being used. Furthermore, this does little to improve the ability of a user or system being able to perform analysis on the documents.

SUMMARY OF THE INVENTION

A method and system to process one or more documents in a domain. The method includes modeling the domain with a plurality of domain models using an ontological system; representing each document as a collection of one or more domain models; and populating the domain models that are used to represent the document with values corresponding to properties of the document being represented.

The invention also extends to a machine-readable medium embodying a sequence of instructions that, when executed by a machine, cause the machine to perform anyone of the methods described herein.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
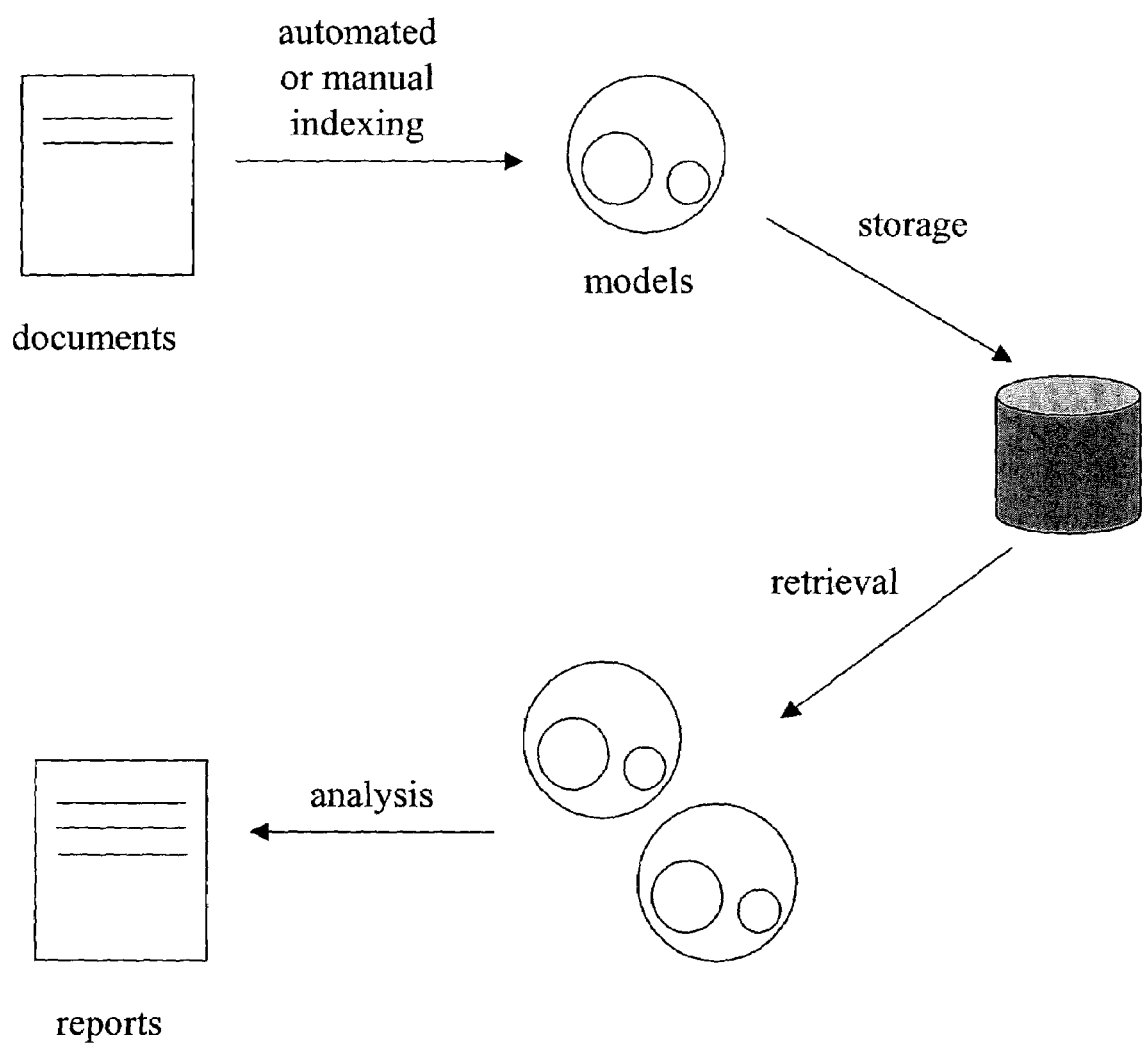
FIG. 1 is a block diagram, according to an exemplary embodiment of the present invention, illustrating an overview of a general process for utilizing an ontological modeling system for publishing documents.

As discussed herein, the present invention provides a method, system, and machine-readable medium for establishing a consistent infrastructure for data modeling and publishing based on underlying ontological models. In the following description, for purposes of explanation, numerous specific details are set forth in order to provide a thorough understanding of the present invention. It will be evident, however, to one skilled in the art that the present invention may be practiced without these specific details.

The following discussion assumes an ontological or object-orientated modeling system is being used such as that described in the U.S. Provisional Application No. 60/361,746 filed on Mar. 4, 2002, which is incorporated herein in its entirety by reference. However, alternative-modeling systems may also be used.

In the process described herein, ontologies are used as a basis for building repositories of structured information on complex domains including, for example, molecular structures, genes or diseases. Life sciences, medical or other scientific documents are used to derive information which is entered or catalogued in the ontology. As an example, ontologies have been built to catalog detailed information on biological concepts such as genes or proteins, molecular pathways or medical conditions.

This invention makes a novel use of ontologies, to create, for any document (where a document may be, for example, a text, a database report, etc.), a corresponding model of that document built by extracting relevant elements of that text corresponding to models in an ontology. Hence, a unique model is created for each individual document, which may then be used by users or computer applications. This ontological model constitutes a "computation-ready" version of the original document, where information is highly structured and numerical information is maintained as part of the model. These structures and data in the model can easily be used or exploited by any other computer application. Further, when generating a model of the original document, the ontologies may add relevant information that is not in the document itself but augments its information content or allows a user or computer application to augment this information.

Traditional use of ontologies consists of taking a knowledge-base of information and creating a single collective view or representation of this knowledge as an ontology with a single consistent view. The concepts, processes, and methodology described herein, in contrast, allow for the creation of a collection of models based on different knowledge sources involving a loose ontology that doesn't require consistency across all data sources. As an example, one knowledge source describes a gene as a tumor suppressor gene while another data source describes the same gene as non-functional. In one embodiment of the invention described herein, both sources of data can be successfully modeled independently, using the same ontology without conflict.

According to one aspect of the present invention, an approach discussed here involves ontological modeling in which documents are modeled by describing them as a set of one or more instances of models. The set of models describing the documents can define specific relationships or contexts between the models, as described in the documents, but in a manner that is explicit and allows for machine processing. Scientific documents are particularly rich in context-sensitive information that is difficult to analyze or discover without intelligent processes or without an indexing process that properly prepares the data for further analysis. In one embodiment of the invention, a process described herein makes search and data analysis of scientific documents more amenable to computer and human analysts alike.

An overview of a document publishing system is shown in FIG. 1, according to an exemplary embodiment of the present invention. In one embodiment, the documents are analyzed to create a model representation of the documents. This process may be completed by human input or may be completed automatically by a computer system. In one embodiment it may involve a combination of both human and computer input, perhaps with an initial automated analysis followed by a manual revision process.

The model representation formed from the document is stored by the modeling system, possibly as part of a collection with other model representations representing other documents. In one embodiment, this collection of modeled documents is then made searchable by various model properties using the underlying search mechanism of the modeling system.

In one embodiment, the system performing search and retrieval of documents allows the requesting system the ability to retrieve models and/or the original documents for further analysis. The model form of the document should be understood by the querying system, such that the returned models can then be further analyzed for specific properties. In addition, the collection could be statistically analyzed for collective properties (e.g. averages, minimum/maximum values, clustering analysis, etc.).

As an example, a collection of documents describing clinical trials could be indexed using this approach, with models being created that describe the documents' contents, for example, with 'clinical trial' models. The clinical trial models might include a 'number of patients' property that indicates how many patients were involved in the clinical trial. As an example, a querying system would then be able to search for all documents that described clinical trials with over 50 patients. Also, after a set of models was returned from a query, the querying system could then use the 'number of patients' property to estimate the total cost of each trial, or it could use the property for each model to determine an average number of patients involved in the clinical trials.

Figure 2:
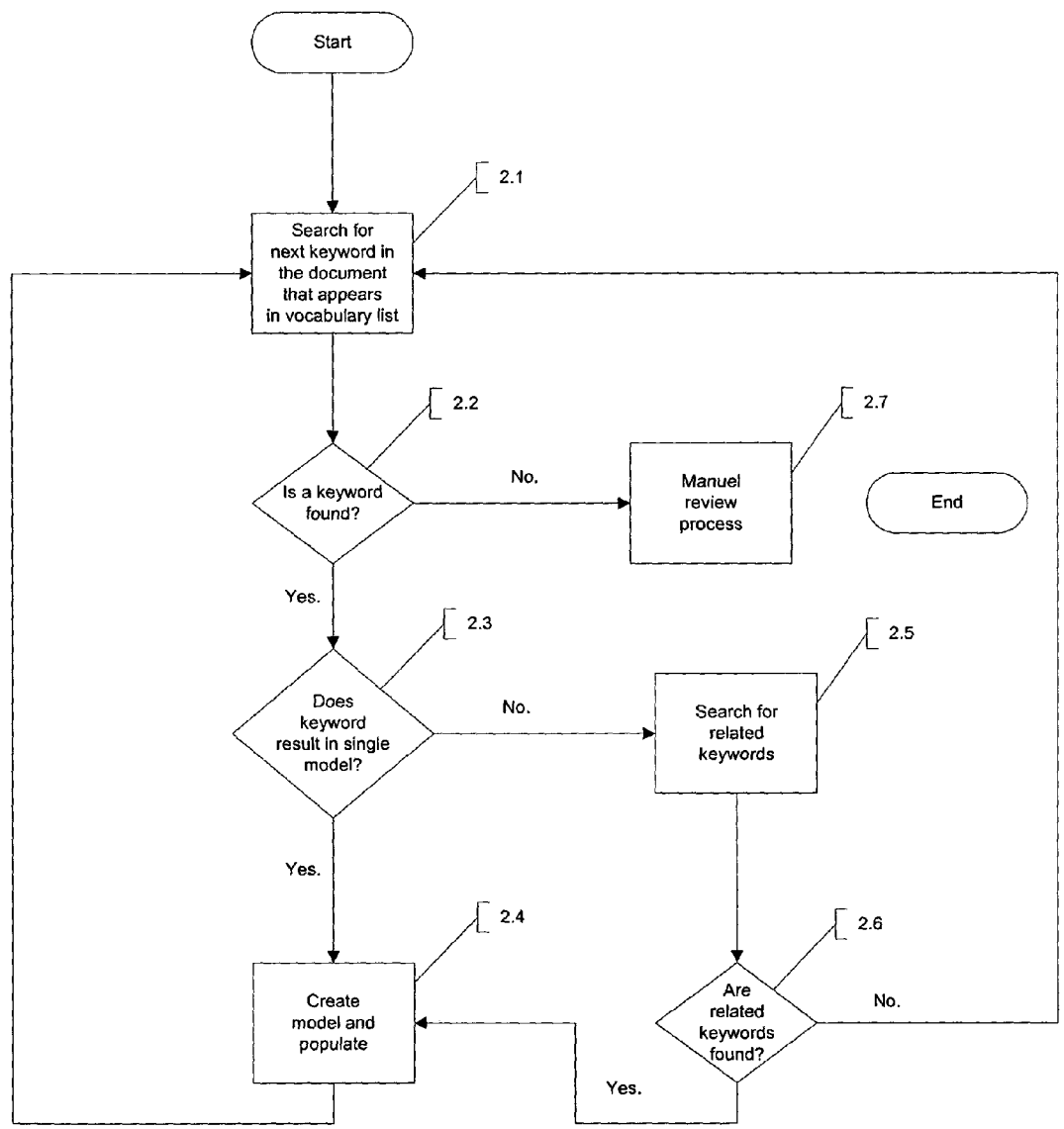
FIG. 2 is a flow chart, according to an exemplary embodiment of the present invention, illustrating a process to automatically classify documents and transform them into models.

A sample process for automatically generating models based on keywords is shown in FIG. 2, according to an exemplary embodiment of the present invention. In one embodiment using this process, a collection of keywords that relate to specific objects are compared to one or more documents being analyzed. As an example, the keyword 'Aspirin' might correspond to a 'drug' object. In this case, if the word 'Aspirin' appears in a document, a 'drug' object might be created and would be populated, for example, with 'aspirin' as the common name of the drug. In more complicated embodiments, the model could be further populated, for example, with the drug's generic name ("acetylsalicylic acid") in the generic name property of the drug model.

Initially the document is searched for keywords that appear in a pre-set vocabulary list (at block 2.1). This list could correspond to a list created manually or from a pre-existing set of populated models, or even from a set of model definitions that have, for given properties, pre-defined values. Alternatively, or in addition, the list may be created utilizing a pre-existing vocabulary/terminology system. For example, in one embodiment for health care related terms, the MESH terminology can be easily adapted to correspond to appropriate objects based on the placement of the term within the MESH hierarchy. This approach allows for a large vocabulary with little effort.

If a match is found with a keyword (at block 2.2), and the keyword corresponds to only one model type (block 2.3) then a model for that type would be created for that concept (at block 2.4) and stored as part of that documents model set.

In more complicated cases, more than one keyword may be necessary to trigger the creation of an object, either due to ambiguous terminology or due to models corresponding to broader concepts that involve multiple keywords. In one case, as an example, the keyword 'HER-2' may be a reference to a 'gene' object or it may be a reference to a 'protein' object. In this case, the context of the keyword in the document differentiates between which object is created. Such a process is shown at block 2.5, where additional keywords are searched for to differentiate the meaning of the first 'trigger' keyword. If any keywords are found which enable the clarification of the context, the appropriate model object is created (block 2.6). If not, in one embodiment, the keyword could be marked for review by a human auditor of the indexing process, who could then decide which model object to create.

Even in this process, a review by a human may still be necessary. Furthermore, while this process may create a collection of objects, this collection may not correctly model the document's description of the relationships between the objects. For example, the process may create a 'drug' object, a 'treatment' object and a 'dosage' object for a document describing a specific treatment. However, after this process it would be left to another process (e.g., human or automated, block 2.7) to insert the drug object and dosage object inside the treatment object based on the context of the document. This secondary process could be aided by tools which allowed 'dragging and dropping' of one model to into another model by a human reviewer.

In one embodiment of the invention, the system as described is used for managing resources that are typically managed by an Enterprise Resource Planning (ERP) system. In this case, the invention would be used to manipulate (store/search/modify/compute against) models that represent the resources being managed. In this fashion, deep domain-specific models could be managed.

Example Implementation

The following example is provided for illustration and explanation purposes as a description of one possible instance of the process described. It should not be construed to limit the scope of the invention in anyway.

In this example implementation, a group or individual wish to take a set of publications (for example, conference or journal abstracts) that describe clinical studies in breast cancer, and make them searchable by a variety of criteria and perform certain analysis on them.

Figure 3:
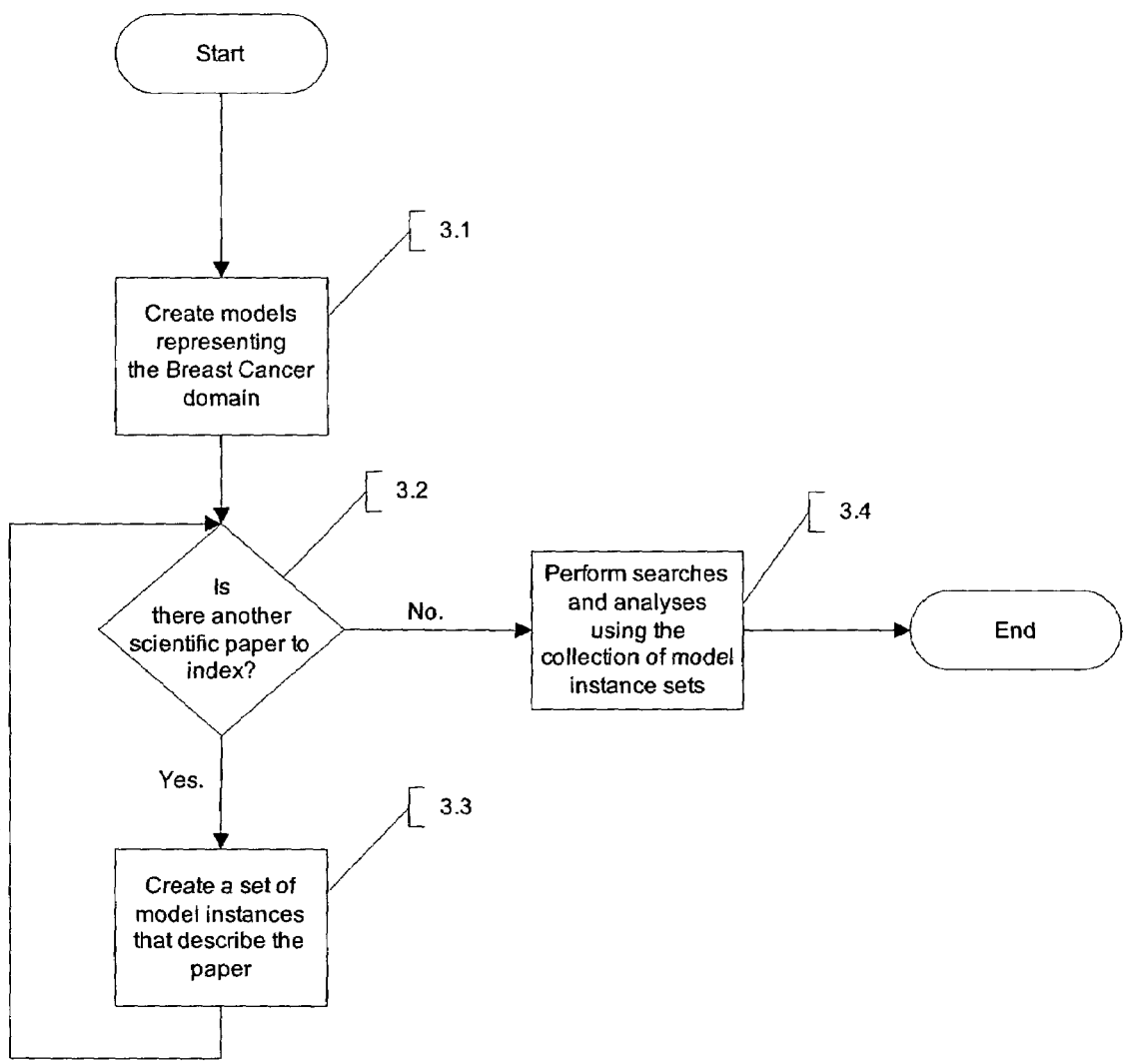
FIG. 3 is a block diagram, according to an exemplary embodiment of the present invention, illustrating an example implementation of the invention.

FIG. 3 is a flow chart, according to an exemplary embodiment of the present invention, that illustrates a process utilized by a model designer to create models for the breast cancer domain (block 3.1). During this process, the designer creates models for the condition, treatment modes, drugs, diagnostics and other notions involved in the field of breast cancer. Models of the breast cancer condition may include, for example, a property that represents the stage of disease progression. As another example, patient models may have properties that represent age, menopausal status, and may itself contain other created models, such as a condition model. Other models might be created such as a model of a clinical trial, with properties that allow the precise description of different arms of the trial and the results of the trial.

An application is then created that allows a reviewer (either human or machine) to describe the publications about breast cancer using the models. For each publication (block 3.2), the reviewer may create collections of model instances that describe the contents of that abstract (block 3.3). In this example, the reviewer may be a human who uses a web form to input information about the abstract, which is then translated by the application to create model instances.

Each abstract or full publication is then represented by a collection of models. The model instances represent a "computation-ready" form of the original information that can be understood by other computer applications. If the above process is done for many publications, then many such collections exist, and this set of collections can then be searched for papers that match very specific criteria against information that has been captured by the models (block 3.4).

Alternatively or in addition to searching, the set of collections of models can be analyzed for content, either individually (representing one paper) or as a set (representing the set of papers). Continuing with the example, a physician might be able to perform a search for all papers that discuss a specific disease state, and may then be able to determine using algorithms acting directly on the collection of models very specific information about the returned collection, such as an average success rate or a ratio comparing study success rates to the study's endpoint. The specific computations allowed by a rich model set are practically limitless, and these analyses become trivial if the models include properties to capture the data pertinent for solving the problem at hand.

In one embodiment, instances from a base set of models or schemas are used to describe the document. The process, however, may itself result in new models being derived from the resulting collection of models, possibly becoming reference models as well.

Figure 4:
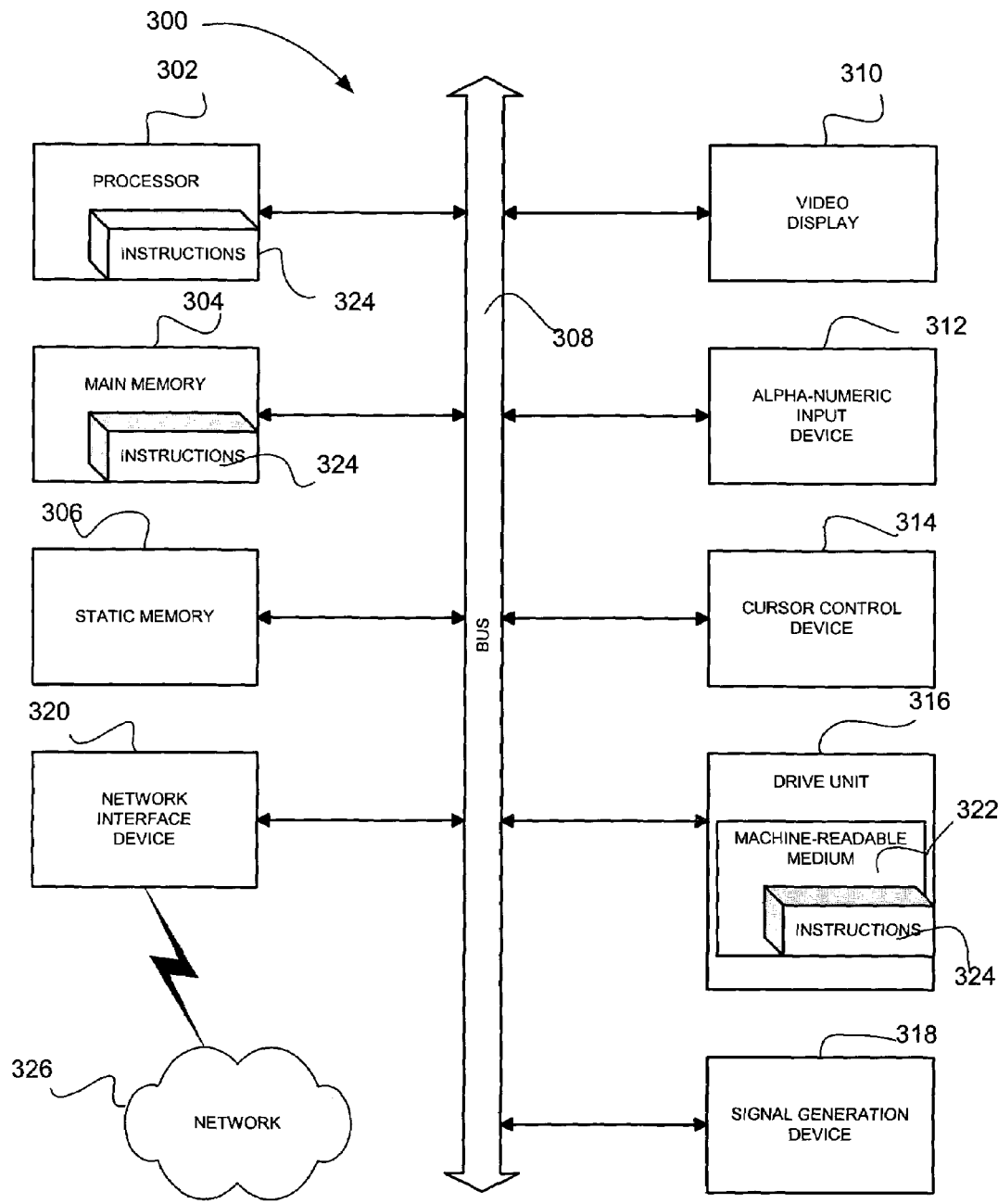
FIG. 4 is a diagrammatic representation of a machine in the exemplary form of a computer system within which a set of instructions, for causing the machine to perform any one or more of the methodologies discussed herein, may be executed.

FIG. 4 illustrates a diagrammatic representation of machine in the exemplary form of a computer system 300 within which a set of instructions, for causing the machine to perform any one or more of the methodologies discussed herein, may be executed. In alternative embodiments, the machine operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alpha-numeric input device 312 (e.g., a keyboard), a cursor control device 314 (e.g., a mouse), a disk drive unit 316, a signal generation device 318 (e.g., a speaker) and a network interface device 320. The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

Alternative and Equivalent Processes

Thus a method, system, and machine-readable medium for establishing a consistent infrastructure for data modeling and publishing based on underlying ontological models have been described. Although embodiments of the present invention have been shown and described, along with certain variants of the invention, it should be understood and recognized by those skilled in the art that many other varied embodiments that incorporate the teachings of the present invention may be implemented or constructed. Accordingly, the scope of the present invention is not to be limited to the specific embodiments, forms or examples described herein.

The invention claimed is:

1. A method to process a document, the method comprising:
    employing a processor executing computer-executable instructions stored on a computer-readable storage medium to perform the following acts:
        determining a presence of keyword in a document based on features of the document and a pre-set vocabulary list, wherein the keyword in the document matches a keyword appearing in the pre-set vocabulary list;
        searching the document for one or more additional keywords related to the matching keyword, to determine a context for the matching keyword;
        generating a set of domain models that represent the document,
            wherein the set of domain models that represent the document is a function of the matching keyword and the one or more additional keywords, and
            wherein the set of domain models comprises properties relevant to the matching keyword;
        populating properties of the set of domain models with corresponding data extracted from the document;
        populating the properties of a set of other domain models representing other documents with corresponding data extracted from the other documents;
        storing the set of domain models with the set of other domain models;

structuring the stored domain models so as to be searchable by a querying system;

retrieving a collection of domain models, from among the stored domain models, in response to a search performed on the document for further analysis of specific domain model properties; and applying an algorithm to the properties of the retrieved collection of domain models to compute a data value relating to the collection of domain models.

2. The method of claim 1, wherein the domain model relates to a simple type or a complex type, the method further comprising:

when a property for the domain model is of the simple type, populating the domain model with a value according to the document being represented; and when a property for the domain model is of the complex type, selectively adding another domain model as a value for the property according to the document being represented.

3. The method of claim 1, further comprising:

searching the set of domain models to determine a subset of features of the document that match search criteria.

4. The method of claim 2, comprising:

analyzing the set of domain models by determining values of properties from at least one domain model, the values extracted from the document represented by the domain model.

5. The method of claim 1, further comprising:

describing the document as instances of the respective domain models of the set.

6. The method of claim 1, further comprising:

setting values in at least one of the domain models that represent supplemental information not in the document but that is associated with the document.

7. The method of claim 2, further comprising:

an automated process where a list of conditions must be met in the document to populate property for the domain model with a value or set of values.

8. The method of claim 1, further comprising representing portions of the documents with respective instances of a subset of the generated domain models.

9. The method of claim 8, wherein the respective instances are computation-ready representations of the portions of the documents that can be understood by at least one computer application.

10. The method of claim 1, wherein a hierarchy of domain models is generated as a function of respective analyzed features.

11. A method to facilitate locating a document, the method comprising:

employing a processor executing computer-executable instructions stored on a computer-readable storage medium for performing the following acts:

searching each of a plurality of documents for a presence of at least one matching keyword from a list of keywords;

representing each document with at least one domain model selected based on the matching keyword, the at least one domain model comprising properties relevant to the keyword;

populating the properties of each of the at least one domain model with data extracted from the respective documents;

storing the domain models;

receiving a query related to locating documents;

searching across the stored domain models;

identifying a set of the stored domain models that match criteria of the received query; and applying an algorithm to the respective properties of the identified set of the stored domain models to compute a data value relating to the documents represented by the identified set.

12. The method of claim 11, further comprising searching across the domain models in connection with locating a collection of documents.

13. The method of claim 11, further comprising populating at least one domain model property value with a disparate domain model.

14. The method of claim 11, further comprising populating at least one domain model property value with information associated with the document but not found in the document.

15. A system that executes document processing, the system comprising:

a processor;

a memory communicatively coupled to the processor, the memory having stored therein computer-executable instructions that when executed by the processor, cause the processor to perform:

modeling a domain with a plurality of domain models;

determining a presence of a keyword in a document that matches a keyword appearing in a pre-set vocabulary list;

searching the document for additional keywords related to the matching keyword to determine a context for the matching keyword;

representing the document as a collection of at least one domain model, the domain model selected based at least on the matching keyword and the additional related keywords and having properties relating to the matching keyword;

populating the properties of the at least one domain model with values corresponding to properties of the document being represented; and populating at least one domain model property with a disparate domain model as a value of the domain model property.

16. The system of claim 15, wherein the memory includes stored therein, computer-executable instructions that, when executed by the processor, cause the processor to perform: searching across the plurality of domain models in connection with calculating statistics associated with a set of documents.

17. A machine-readable storage medium storing a set of instructions that, when executed by a machine, cause the machine to:

model a domain with a plurality of domain models;

determine a presence of a keyword in a document that matches a keyword appearing in a pre-set vocabulary list;

search the document for additional keywords related to the matching keyword to determine a context for the matching keyword;

select at least one domain model to represent the document based on the matching keyword and the determined context, the at least one domain model comprising properties relating to the matching keyword and the determined context;

populate the properties of the at least one domain model with values corresponding to properties of the document being represented; and populate at least one domain model property value with a disparate domain model.

* * * * *

UNITED STATES PATENT AND TRADEMARK OFFICE
CERTIFICATE OF CORRECTION

| | | |
|---|---|---|
| PATENT NO. | : 7,657,417 B2 | Page 1 of 1 |
| APPLICATION NO. | : 10/665807 | |
| DATED | : February 2, 2010 | |
| INVENTOR(S) | : Dan Adamson et al. | |

It is certified that error appears in the above-identified patent and that said Letters Patent is hereby corrected as shown below:

In column 6, line 47, in Claim 1, delete "of keyword" and insert -- of a keyword --, therefor.

In column 7, line 36, in Claim 7, before "property" insert -- the --.

Signed and Sealed this
Tenth Day of May, 2011

David J. Kappos
*Director of the United States Patent and Trademark Office*